US010022675B2

(12) United States Patent
Yoneyama (10) Patent No.: US 10,022,675 B2
(45) Date of Patent: Jul. 17, 2018

(54) METHOD OF PRODUCING COMPOSITE FOR ACID GAS SEPARATION AND APPARATUS FOR PRODUCING SAME (71) Applicant: FUJIFILM Corporation, Tokyo (JP)

(72) Inventor: Satoshi Yoneyama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 211 days.

(21) Appl. No.: 14/862,646

(22) Filed: Sep. 23, 2015

(65) Prior Publication Data
US 2016/0008764 A1 Jan. 14, 2016

Related U.S. Application Data (63) Continuation of application No. PCT/JP2014/001824, filed on Mar. 28, 2014.

(30) Foreign Application Priority Data

Mar. 29, 2013 (JP) ................................. 2013-072015

(51) Int. Cl.
B01D 67/00 (2006.01)
B01D 69/10 (2006.01)
(Continued)

(52) U.S. Cl.
CPC ......... *B01D 67/0002* (2013.01); *B01D 53/22* (2013.01); *B01D 63/10* (2013.01);
(Continued)

(58) Field of Classification Search
None
See application file for complete search history.

(56) References Cited

U.S. PATENT DOCUMENTS 5,389,724 A 2/1995 LaFleur
5,445,669 A 8/1995 Nakabayashi et al.
(Continued)

FOREIGN PATENT DOCUMENTS

JP 7-102310 B2 11/1995
JP 2006-243025 A 9/2006
(Continued)

OTHER PUBLICATIONS

Machine Translation of JP 2011-235204 A.*
(Continued)

*Primary Examiner* — Shamim Ahmed
*Assistant Examiner* — Bradford M Gates
(74) *Attorney, Agent, or Firm* — Sughrue Mion, PLLC (57) ABSTRACT A method of producing a composite for acid gas separation by roll-to-roll process, including: a preparation step for preparing a coating liquid, containing a hydrophilic compound, an acid gas carrier and water, for formation of an acid gas separation facilitated transport membrane; a coating step for coating onto the support the coating liquid for formation at a liquid membrane thickness of 0.3 mm to 3.0 mm; a winding step for drying the coated liquid membrane in a drying oven to form the acid gas separation facilitated transport membrane, and winding around a winding roll the composite formed through formation of the acid gas separation facilitated transport membrane on the support, wherein humidity in a winding step unit in which the winding step is performed is measured to control the humidity to be 10% to 60%, and the winding step is performed under the controlled humidity conditions.

6 Claims, 2 Drawing Sheets (51) Int. Cl.
| | |
|---|---|
| *B01D 63/10* | (2006.01) |
| *B01D 53/22* | (2006.01) |
| *B01D 71/76* | (2006.01) |
| *B01D 69/14* | (2006.01) |
| *B01D 71/32* | (2006.01) |
| *B01D 71/38* | (2006.01) |
| *B01D 71/40* | (2006.01) |

(52) U.S. Cl.
CPC ..... *B01D 67/0009* (2013.01); *B01D 67/0095* (2013.01); *B01D 67/0097* (2013.01); *B01D 69/10* (2013.01); *B01D 69/142* (2013.01); *B01D 71/32* (2013.01); *B01D 71/76* (2013.01); *B01D 71/38* (2013.01); *B01D 71/40* (2013.01); *B01D 2053/221* (2013.01); *B01D 2323/42* (2013.01)

(56) References Cited

U.S. PATENT DOCUMENTS

| | | | |
|---|---|---|---|
| 2011/0036237 A1* | 2/2011 | Okada | B01D 69/10 95/51 |
| 2011/0225940 A1* | 9/2011 | Romdhane | B01D 67/0013 55/495 |
| 2013/0284022 A1 | 10/2013 | Hiraki et al. | |
| 2013/0287958 A1 | 10/2013 | Oouchi | |
| 2014/0352540 A1 | 12/2014 | Okada et al. | |

FOREIGN PATENT DOCUMENTS

| | | |
|---|---|---|
| JP | 2010-279885 A | 12/2010 |
| JP | 2011-235204 A | 11/2011 |
| JP | 2012-143711 A | 8/2012 |
| JP | 2013-27850 A | 2/2013 |
| KR | 2010-0015962 A | 2/2010 |
| WO | 2012/096055 A1 | 7/2012 |
| WO | 2012/096114 A1 | 7/2012 |
| WO | 2013/018659 A1 | 2/2013 |
| WO | 2015/029884 A1 | 3/2015 |

OTHER PUBLICATIONS

Communication dated Jun. 21, 2016 from the Japanese Patent Office in counterpart application No. 2013-072015.
Communication dated Jun. 24, 2016 from the European Patent Office in counterpart application No. 14773491.7.
Communication dated Jul. 5, 2016 from the State Intellectual Property Office of the P.R.C. in counterpart application No. 201480017975.3.
Communication dated Feb. 22, 2017 from the State Intellectual Property Office of the P.R.C. in counterpart Application No. 201480017975.3.
International Search Report for PCT/JP2014/001824 dated Jul. 29, 2014.
Written Opinion for PCT/JP2014/001824 dated Jul. 29, 2014.
Communication dated Sep. 28, 2017, from European Patent Office in counterpart application No. 14773491.7.

\* cited by examiner

METHOD OF PRODUCING COMPOSITE FOR ACID GAS SEPARATION AND APPARATUS FOR PRODUCING SAME

CROSS REFERENCE TO RELATED APPLICATIONS

The present application is a Continuation of PCT International Application No. PCT/JP2014/001824 filed on Mar. 28, 2014, which claims priority under 35 U. S. C. § 119(a) to Japanese Patent Application No. 2013-072015, filed on Mar. 29, 2013. Each of the above applications is hereby expressly incorporated by reference in its entirety, into the present application.

BACKGROUND

The present disclosure relates to a method of producing a composite for acid gas separation, the composite having a function of separating an acid gas, and an apparatus for producing the same.

In recent years, development has advanced in techniques for selectively separating an acid gas in a mixed gas. In particular, the development has advanced in a technique for selectively separating carbon dioxide. As global warming countermeasures, for example, a technique has been developed in which carbon dioxide in an exhaust gas is recovered and concentrated, or hydrocarbon is reformed into hydrogen and carbon monoxide (CO) by steam reforming, and further allowing carbon monoxide to react with steam to produce carbon dioxide and hydrogen, and carbon dioxide is eliminated by a membrane through which carbon dioxide is selectively transmitted to obtain a gas containing as a main component hydrogen and for fuel cells or the like.

Meanwhile, with regard to separation of carbon dioxide, an amine absorption method has been general and widely applied, in which adsorption and desorption by amines are repeated. However, this method has disadvantages of needing a vast area for installing facilities, and also needing repetition of pressure increase/decrease and temperature rise/drop during adsorption/desorption to require a large amount of energy. Moreover, system capacity has been determined during design, and expansion or reduction of once established system capacity is far from easy. In contrast, a membrane separation method naturally causes separation depending on partial pressure of carbon dioxide in two regions divided by a separation membrane, and has advantages of small energy consumption and a compact installation area. Moreover, expansion or reduction of the system capacity can also be attained by increase or decrease in filter units. Therefore, a system having excellent scalability can be formed, and has recently attracted attention.

Composites for carbon dioxide separation used in the membrane separation method are generally classified into a so-called facilitated transport membrane in which a carbon dioxide carrier is contained in a carbon dioxide separation layer on a support, and carbon dioxide is transported on a side opposite to the membrane by this carrier, and a so-called dissolution diffusion membrane in which separation is performed by utilizing differences in solubility and diffusivity into the membrane between carbon dioxide and a separation target gas other than carbon dioxide (hereinafter, simply referred to as "separation target substance") relative to the carbon dioxide separation layer.

In the dissolution diffusion membrane, the separation is performed based on the differences in the solubility into the membrane and the diffusivity into the membrane between carbon dioxide and the separation target substance. Therefore, if material and physical properties of the membrane are determined, a degree of separation is primarily determined, and accordingly as a membrane thickness becomes smaller, a rate of transmission of the mixed gas becomes larger. Therefore, the dissolution diffusion membrane is generally produced in the form of a thin film having a thickness of 1 μm or less by applying a producing method such as a layer separation method and an interfacial polymerization method.

In contrast, in the facilitated transport membrane, the solubility of carbon dioxide is significantly increased by the carbon dioxide carrier in the membrane and carbon dioxide is transported in the membrane with a high concentration. Therefore, the membrane generally has features of a higher degree of separation of carbon dioxide separation relative to the separation target substance in comparison with the dissolution diffusion membrane, and a larger rate of transmission of carbon dioxide. Moreover, a carbon dioxide concentration in the membrane is high, and thus a rate of diffusion of carbon dioxide in the membrane rarely serves as a rate-determining factor, and therefore in view of increasing the degree of separation relative to the separation target substance, the membrane is preferably formed into a thick film having a thickness of 10 μm or more.

For example, Japanese Examined Patent Publication No. 7(1995)-102310 (hereinafter, Patent Document 1) describes a method of producing a composite for carbon dioxide separation, in which an aqueous solution of uncrosslinked vinyl alcohol-acrylate copolymer is coated onto a carbon dioxide-permeable support in a membrane shape to form a liquid membrane of the aqueous solution of uncrosslinked vinyl alcohol-acrylate copolymer on the support, and then the liquid membrane is heated to cause crosslinking to form a water-insolubilized membrane, and an aqueous solution containing a carbon dioxide carrier (substance having affinity with carbon dioxide) is absorbed into the water-insolubilized membrane to produce a hydrogel membrane.

Japanese Unexamined Patent Publication No. 2012-143711 (hereinafter, Patent Document 2) describes a method of producing a composite for carbon dioxide separation, in which a gelling agent such as agar is added to a coating liquid containing a polyvinyl alcohol-polyacrylic acid copolymer and alkali metal carbonate, the coating liquid prepared at 50° C. or higher is coated onto a support, and then the resultant liquid membrane is cooled to cause hardening.

SUMMARY

A method of producing a composite for carbon dioxide separation described in Patent Document 1 requires at least three steps including a step for coating onto a carbon dioxide-permeable support an aqueous solution of vinyl alcohol-acrylate copolymer without containing a carbon dioxide carrier, a step of heating to cause crosslinking and to form a water-insolubilized membrane, and a step of allowing the aqueous solution containing the carbon dioxide carrier to absorb into the water-insolubilized membrane. Therefore, production efficiency is poor and production cost becomes high. Furthermore, variations in each step are overlapped, and a fluctuation of performance as the composite for carbon dioxide separation becomes inevitably large.

Moreover, in a method of producing a composite for carbon dioxide separation, the composite having a $CO_2$ facilitated transport membrane, as described in Patent Document 2, a gelling agent is added to an aqueous solution containing a hydrophilic compound such as a polyvinyl alcohol-polyacrylic acid copolymer, and a carrier such as alkali metal carbonate. Therefore, the method requires a step of introducing the gelling agent and a step of cooling a coated membrane. Therefore, a producing process tends to become longer, and simplification of process, and efficiency improvement have posed a problem.

Further, the facilitated transport membrane has as constituent materials the hydrophilic compound such as the hydrophilic polymer, and the carbon dioxide carrier such as alkali metal carbonate, and all of these components are a material having a significant large amount of water absorption. Therefore, even if a dry membrane is obtained by applying the above-described composition onto the support, and then drying the applied membrane, various problems occur in production under a high humid environment. For example, when the above-described carbon dioxide separation membrane is produced according to roll-to-roll, a water-absorbed gel membrane in an area between an outlet of a drying oven and a winding step sticks onto a surface of a pass roll to be brought into contact with the gel membrane to cause membrane peeling or contamination in the step (gel membrane adhesion, wetting of the roll by an alkaline aqueous solution, wiping work caused due to smearing, and film deformation due to a grip effect). Moreover, it has been revealed according to studies by the present inventors that, in a winding unit, the water-absorbed gel membrane is brought into contact with a support (support rear surface) on a side opposite to an applied surface to cause sticking between the gel membrane and the support rear surface, and upon peeling, a flaw or unevenness is caused on a membrane surface, and desired performance as the facilitated transport membrane is unobtainable.

The problems described above are common not only to production of the composite for carbon dioxide separation, the composite having the function of separating carbon dioxide, but also to production of a composite for acid gas separation, the composite having a function of separating other acid gases.

The present disclosure has been made in view of the above-described problems, and the present disclosure provides a method of producing a composite for acid gas separation, in which the composite for acid gas separation, the composite having an acid gas separation facilitated layer having suppressed membrane defects and a high degree of separation of a predetermined acid gas, is produced in a limited number of steps and with high efficiency, and an apparatus for producing the same.

A method of producing a composite for acid gas separation of the present disclosure refers to the method of producing the composite for acid gas separation, the composite provided with an acid gas separation facilitated transport membrane having a function of separating an acid gas in a raw material gas on a porous support, according to a roll-to-roll process, including:

a coating liquid preparation step for preparing a coating liquid for formation of an acid gas separation facilitated transport membrane, the coating liquid containing a hydrophilic compound, an acid gas carrier and water;

a coating step for coating onto the porous support the coating liquid for formation at a liquid membrane thickness of 0.3 mm to 3.0 mm;

a drying step for drying a previously coated liquid membrane in a drying oven to form the acid gas separation facilitated transport membrane; and a winding step for winding around a winding roll the composite for acid gas separation formed through formation of the acid gas separation facilitated transport membrane on the porous support, wherein humidity in a winding step unit in which the winding step is performed is measured to control the humidity to be 10% or more and 60% or less, and the winding step is performed under controlled humidity conditions.

In the winding step, the humidity is further preferably controlled to be 10% or more and 40% or less. The humidity herein refers to relative humidity.

As the porous support, a laminated membrane comprising a hydrophobic porous membrane and a nonwoven fabric is preferably used to coat the coating liquid for formation onto the hydrophobic porous membrane of the laminated membrane.

The hydrophilic compound is preferably a hydrophilic polymer. Moreover, as the hydrophilic polymer, a polyvinyl alcohol-polyacrylic acid copolymer is preferred.

The acid gas carrier preferably contains a compound containing at least one selected from alkali metal carbonate.

In the drying oven, a temperature is preferably adjusted to be gradually higher in the range of 60° C. or higher and 120° C. or lower accordingly from a side of an inlet of the drying oven toward a side of discharge to dry the liquid membrane.

The apparatus for producing the composite for acid gas separation of the present disclosure is the apparatus for producing the composite for acid gas separation, the composite provided with the acid gas separation facilitated transport membrane having the function of separating the acid gas in the raw material gas on the porous support, according to the roll-to-roll process, including:

a coating unit for coating onto the porous support a coating liquid for formation of an acid gas separation facilitated transport membrane, the coating liquid containing a hydrophilic compound, an acid gas carrier and water, at a liquid membrane thickness of 0.3 mm to 3.0 mm;

a drying unit for drying the coated liquid membrane in a drying oven to form the acid gas separation facilitated transport membrane; and a winding step unit for winding around a winding roll the composite for acid gas separation formed through formation of the acid gas separation facilitated transport membrane on the porous support, wherein the winding step unit is provided with a humidity detector for measuring humidity in the winding step unit, a humidity adjusting unit for adjusting the humidity to be 10% or more to 60% or less, and a control unit for controlling adjustment by the humidity adjusting unit according to the humidity measured by the humidity detector.

According to a method of producing a composite for acid gas separation of the present disclosure, in production according to a roll-to-roll process, humidity in a winding step unit for winding the composite for acid gas separation by a winding roll is controlled, and a winding step is performed under a controlled humidity environment. Therefore, control can be made such that the acid gas separation facilitated transport membrane having large water absorptivity causes no excessive water absorption, and suppression can be achieved such that no acid gas separation facilitated transport membrane causes sticking onto a pass roll surface to cause membrane peeling and contamination in the step (gel membrane adhesion, wetting of the roll by an alkaline aqueous solution, wiping work due to smearing, and film deformation due to a grip effect), and upon being would around the winding roll, suppression can be made such that no acid gas separation facilitated transport membrane is stuck onto a support rear surface. The contamination in the step is suppressed, and therefore production can be efficiently made, and occurrence of defects on a membrane surface of a facilitated transport surface can be suppressed. Therefore, the composite for acid gas separation, the composite having high separation performance, can be produced.

Moreover, the production method of the present disclosure needs no gelling agent such as agar. Therefore, addition of the gelling agent and a cooling step after the coating liquid for formation is coated as needed in Patent Literature 2 are unnecessary, and therefore a process is simplified and further efficient production can be made.

DETAILED DESCRIPTION OF THE PREFERRED EMBODIMENTS

Embodiments of the present disclosure are described below, referring to drawings.
<Method of Producing Composite for Acid Gas Separation>

A method of producing a composite for acid gas separation of the present disclosure refers to the method of producing the composite for acid gas separation, the composite provided with an acid gas separation facilitated transport membrane having a function of separating an acid gas in a raw material gas on a porous support, according to a roll-to-roll process, including: a coating liquid preparation step for preparing a coating liquid for formation of an acid gas separation facilitated transport membrane, the coating liquid containing a hydrophilic compound, an acid gas carrier and water; a coating step for coating onto the porous support the coating liquid for formation at a liquid membrane thickness of 0.3 mm to 3.0 mm; a drying step for drying the coated liquid membrane in a drying oven to form the acid gas separation facilitated transport membrane; and a winding step for winding around a winding roll the composite for acid gas separation formed through formation of the acid gas separation facilitated transport membrane on the support, wherein humidity in a winding step unit in which the winding step is performed is measured to control the humidity to be 10% or more and 60% or less, and the winding step is performed under controlled humidity conditions.

In the coating liquid preparation step as related to the present disclosure, the coating liquid for formation of an acid gas separation layer, the coating liquid containing the hydrophilic compound such as the hydrophilic polymer, the acid gas carrier and water, is prepared.

From viewpoints of surface properties after coating and a high speed, viscosity of the coating liquid is preferably 0.5 to 5 Pa·s (500 to 5,000 cp), and further preferably 1 to 2 Pa·s (1,000 to 2,000 cp). As the viscosity on the above occasion, a value measured at 60 rpm and a liquid temperature of 25° C. by using a B type viscometer is to be adopted. If the viscosity is 0.5 Pa·s or more, flow of the membrane after coating can be suppressed to attain a uniform membrane thickness. Moreover, if the viscosity exceeds 5 Pa·s, removal of air bubbles in the coating liquid becomes difficult and uniformization of the membrane thickness becomes hard.

In the coating step, the prepared coating liquid for formation of the acid gas separation facilitated transport membrane is coated onto the porous support at a liquid membrane thickness of 0.3 mm to 3.0 mm. If the liquid membrane is 0.3 mm thick or more, a sufficient acid gas separation function can be obtained in the acid gas separation facilitated transport membrane to be formed. If the liquid membrane is 3.0 mm thick or less, occurrence of defects due to air bubbles and foreign matters during application can be suppressed. The thickness of the liquid membrane is further preferably in the range of 1.0 mm or more and 2.5 mm or less, and particularly preferably in the range of 1.0 mm or more and 2.0 mm or less.

As the support, in particular, a laminated membrane between a hydrophobic porous membrane and a nonwoven fabric serving as an auxiliary support membrane is preferably used. Mechanical strength can be improved by having the auxiliary support membrane. Therefore, such structure is effective in causing no wrinkles on the support membrane even if handling is performed in a roll-to-roll coating device, and productivity can also be improved.

A coating method is not particularly limited, as long as the coating liquid of having the above-mentioned viscosity can be coated at the above-described thickness by the method. The viscosity is high and the thickness is large, and therefore post-measuring methods such as a roll coating method and a blade coating method are most suitable, in which a large amount of the coating liquid is transferred onto the support immediately before the coating, and then the thickness is adjusted to a desired level by using a mechanism described later. As other coating methods, an extrusion coating method, a dip coating method, a bar coating method, a curtain coating method or the like may be adopted. Moreover, a plurality of coating methods may be combined. The roll coating method and the blade coating method are preferred in view of inexpensiveness in production facilities.

In the drying step, the coated liquid membrane is dried in the drying oven to form the acid gas separation facilitated transport membrane. Here, "drying" means removal of at least part of moisture contained in the liquid membrane of the coating liquid for formation of the acid gas separation facilitated transport membrane formed on the support in the coating step.

A temperature in the drying oven is preferably appropriately determined in the range of 60 to 120° C. If the temperature is 60° C. or higher, a drying time can be suppressed within a practical time. On the other hand, the temperature on a high temperature side can be appropriately determined mainly according to heat resistance of the support, and is adjusted to about 120° C. herein.

In addition, in view of stability of a membrane surface, the temperature in the drying oven is preferably 60 to 90° C., and further preferably 70 to 80° C. As drying methods, various kinds of drying methods such as a drying method using warm air and a drying method using an infrared heater can be applied. As long as the temperature inside the drying oven is 60 to 120° C., temperature uniformity is not always required. Moreover, the temperature is further preferably set to be gradually increased from a side of an inlet of the drying oven toward a side of an outlet (discharge port) of the drying oven. For example, the temperature is set to 70° C. in the vicinity of the inlet of the drying oven, to 80° C. in the vicinity of a center of the drying oven, to 90° C. in the vicinity of the outlet of the drying oven, or the like.

The winding step is the step for winding around the winding roll the composite for acid gas separation formed through formation of the acid gas separation facilitated transport membrane on the support. In the present disclosure, the humidity in the winding step unit including an area after the outlet of the drying oven to the winding roll, in which the winding step is performed, is controlled, and the winding step is performed under an environment of 10% or more and 60% or less in the humidity. The humidity in the environment in the winding step is further preferably controlled to be 10% or more and 40% or less.

If the humidity is 10% or more, occurrence of cracking of the acid gas separation facilitated transport membrane to be formed after drying can be suppressed. Moreover, if the humidity is 60% or less, a moisture content in the acid gas separation facilitated transport membrane can be suppressed to 20% or less, and a problem of sticking of a coated surface onto a conveyance roll surface can be suppressed, and occurrence of membrane defects can be suppressed. Here, when a mass of a 10 cm-square facilitated transport membrane under an environment of a dew point of −20° C. is taken as A, and a mass of a 10 cm-square facilitated transport membrane at 25° C. under an environment of a relative humidity of 20% is taken as B, the moisture content is expressed in terms of a value calculated according to the following formula:

$$(B-A)/B \times 100.$$

The humidity in the winding step unit from the outlet of the drying oven to the winding roll does not need to be uniform, but the winding step needs to be performed under the environment of 10% or more and 60% or less in the humidity in all of places through which the coated membrane passes or in which the membrane exists.

In addition, the temperature in the environment is 15 to 35° C., and preferably 20 to 30° C.

In the coating liquid for formation of the acid gas separation facilitated transport membrane, a mass ratio of a water absorbent polymer and the acid gas carrier is preferably adjusted to be 1:9 or more and 2:3 or less.

A case where the mass ratio of the hydrophilic polymer and the acid gas carrier is 1:9 or more and 2:3 or less in the coating liquid for formation of the acid gas separation layer allows the coating step in which the coating liquid is coated onto the support under temperature conditions of 15° C. or higher and 35° C. or lower and at a viscosity of 0.5 Pa·s or more and 10 Pa·s or less in a measured value of viscosity at 60 rpm in the number of revolutions in B type viscosity measurement to form on the support the liquid membrane of the coating liquid for formation of the acid gas separation layer. If the mass ratio of the hydrophilic polymer and the acid gas carrier becomes smaller than 1:9, difficulty is caused in obtaining the coating liquid showing the viscosity of 0.5 Pa·s or more, in the temperature range of 15° C. or higher and 35° C. or lower, and in the measured value of viscosity at 60 rpm in the number of revolutions in B type viscosity measurement. On the other hand, if the mass ratio of the hydrophilic polymer and the acid gas carrier becomes larger than 2:3, a solid content contained in the coating liquid (aqueous solution) is inhomogeneously mixed to become cloudy, and depending on circumstances, results in insufficiency of flowability suitable for coating. Further, if the coating liquid is coated under temperature conditions of 15° C. or higher and 35° C. or lower and at the viscosity less than 0.5 Pa·s in the measured value of viscosity at 60 rpm in the number of revolutions in B type viscosity measurement, formation of the acid gas separation facilitated transport membrane having a desired thickness is difficult. As a result, the acid gas separation facilitated transport membrane having excellent separation efficiency is unobtainable, and also such viscosity easily causes a problem of leak-out of the coating liquid in the coating step or difficulty in forming a separation layer having a desired thickness. Moreover, if the coating liquid is coated under temperature conditions of 15° C. or higher and 35° C. or lower and at a viscosity more than 10 Pa·s in the measured value of viscosity at 60 rpm in the number of revolutions in B type viscosity measurement, formation of the acid gas separation facilitated transport membrane having uniform thickness becomes difficult in the coating step, and it is hard to obtain the acid gas separation facilitated transport membrane having high acid gas separation efficiency, a high rate of transmission of the acid gas and excellent performance.

Further, the mass ratio of the hydrophilic polymer and the acid gas carrier is 1:9 or more and 2:3 or less. Thus, the acid gas separation facilitated transport membrane having excellent performance is obtained in which a degree of separation of the acid gas relative to a separation target substance is high and the rate of transmission of the acid gas is large.

In a preferred embodiment of the present disclosure, in the coating step, the coating liquid for formation of the acid gas separation facilitated transport membrane is coated onto the support, in the range of 15° C. or higher and 35° C. or lower and at a viscosity of 0.7 Pa·s or more and 9 Pa·s or less in the measured value of viscosity at 60 rpm in the number of revolutions in B type viscosity measurement. In a particularly preferred embodiment, the coating liquid is coated onto the support, in the range of 15° C. or higher and 35° C. or lower and at a viscosity of 1 Pa·s or more and 5 Pa·s or less in the measured value of viscosity at 60 rpm in the number of revolutions in B type viscosity measurement. Thus, the acid gas separation facilitated transport membrane having no defects such as no mixing of air bubbles, and having a uniform membrane thickness is markedly easily and stably obtained. The viscosity is adjusted in such a range. Thus, even if the temperature of the coating liquid in the coating step varies upward or downward in the range of 5° C., such viscosity facilitates coating of the coating liquid having the viscosity of 0.5 Pa·s or more and 10 Pa·s or less in the measured value of viscosity at 60 rpm in the number of revolutions in B type viscosity measurement.

In the method of producing the composite for acid gas separation of the present disclosure, according to the production apparatus according to the Roll-to-Roll process using a belt-shaped (web-shaped), a high performance composite for acid gas separation, the composite having only a limited number of membrane defects, can be produced by the method with high production efficiency and at low production cost.

Moreover, in production according to the roll-to-roll process, the humidity in the winding step unit for winding the composite for acid gas separation by the winding roll is controlled, and the winding step is performed under a controlled humidity environment, and therefore control can be made such that no gas separation facilitated transport membrane having large water absorptivity causes excessive water absorption. A problem occurred when water absorption in the acid gas separation facilitated transport membrane causes sticking of a facilitated membrane surface onto a pass roll surface, a support rear surface or the like during winding becomes increasingly severer accordingly as the thickness of the acid gas separation facilitated transport membrane becomes thicker. Therefore, an effect by the present disclosure will become further significant.

The humidity during the winding step is controlled as in the present disclosure. Thus, handling properties in the roll-to-roll improves, and the composite for acid gas separation, the composite having a limited number of defects can be stably and efficiently produced.

<Apparatus for Producing Composite for Acid Gas Separation>

Figure 1:
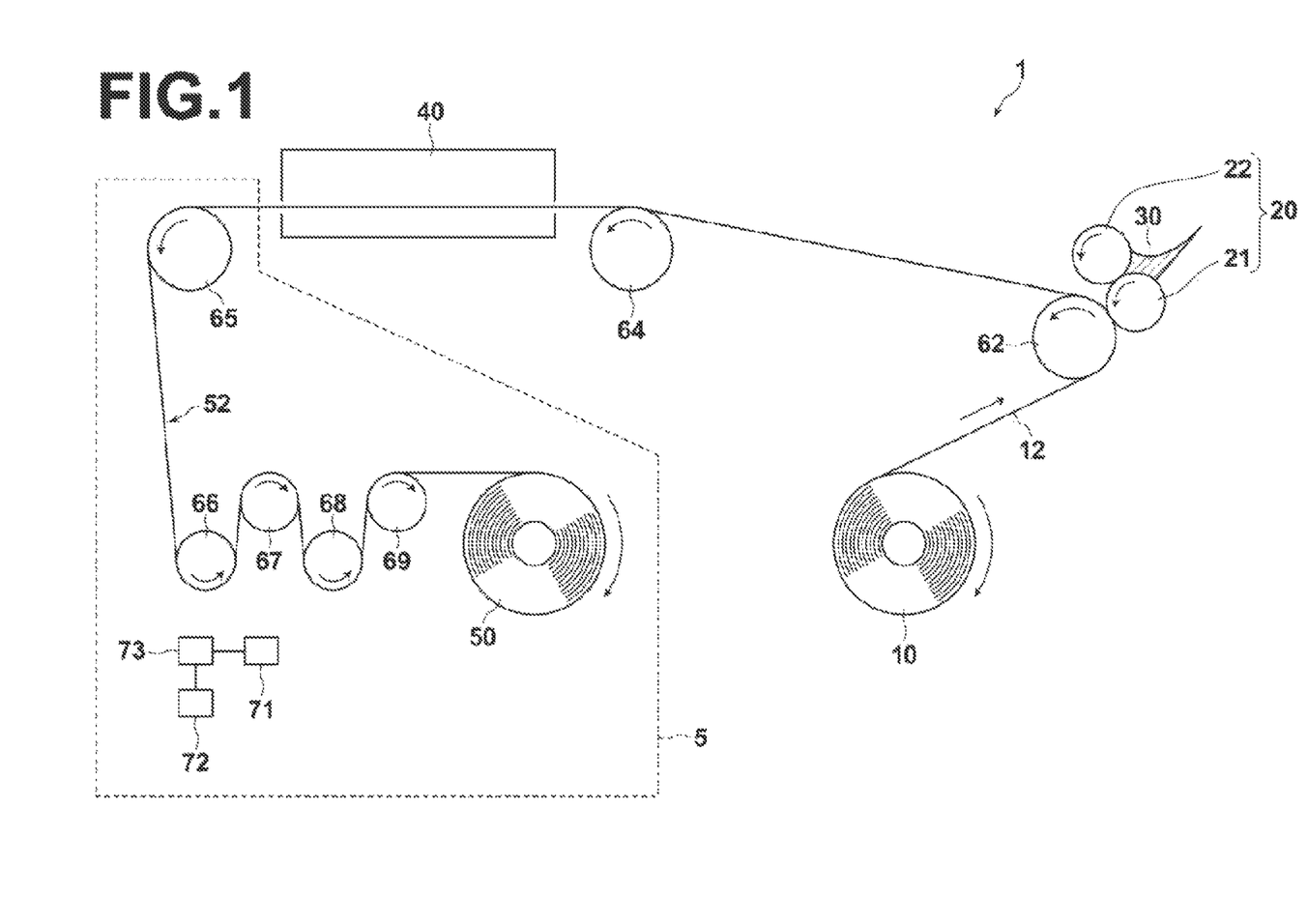
FIG. 1 is a schematic view showing an example of structure of a production apparatus used in a method of producing a composite for acid gas separation as related to the present disclosure.

One embodiment of the production apparatus related to the embodiment of the present disclosure for carrying out the method of producing the composite for acid gas separation of the present disclosure is described by using FIG. 1.

FIG. 1 schematically shows one example of apparatus structure used in a process for producing a composite for acid gas separation as related to the present disclosure. This apparatus 1 is equipped with a coating unit having a feeding roll 10 for feeding a belt-shaped support 12, and a coater 20 for coating onto the support 12 a coating liquid 30 for formation of an acid gas separation layer (in FIG. 1, a three-roll coater composed of an applicator roll 21, a metering roll 22 and a backup roll 62 also serving as a roll for conveying the belt-shaped support 12, rotating in an arrow direction in the figure), a drying unit provided with a drying oven 40 for drying a liquid membrane (not shown) of the coating liquid 30 formed on the support 12, and a winding step unit 5 provided with a winding roll 50 for winding the thus obtained composite 52 for acid gas separation. Moreover, in each unit 20, 40 or 50, a conveying roll 62 (in FIG. 1, functioning also as the backup roll of the roll coater), and rolls 64 to 69 for conveying the support 12 are arranged.

The apparatus 1 having such structure is used. Thus, according to Roll-to-Roll, more specifically, the support 12 is fed from the feeding roll 10, and while the support 12 is conveyed, the coating step and the drying step are sequentially performed, and the thus obtained composite 52 for acid gas separation can be wound around the roll 50, and the composite 52 for acid gas separation can be continuously and efficiently produced.

Further, in order to control the humidity in the winding step unit 5 from the discharge port of the drying oven 40 to the winding roll 50, the present production apparatus 1 is equipped with a humidity detector 71 for detecting the humidity in the winding step unit 5, a humidity adjusting device 72 for adjusting the humidity in the winding step unit 5, and a control unit 73 for controlling the humidity adjusting device 72 in which, when the humidity detected by the humidity detector 71 is 10% or more and 60% or less, dehumidification or humidification is performed to adjust the humidity inside the step unit 5 to 10% or more and 60% or less, and preferably 10% or more and 40% or less. In addition, only the winding step unit 5 may be disposed inside a package in which the humidity can be controlled, or the production apparatus 1 as a whole may be arranged inside the package in which the humidity can be controlled.

In FIG. 1, one humidity detector 71 is provided in the winding step unit 5, but a plurality of the detectors may be provided inside the winding step unit 5. If the inside of the winding step unit 5 has substantially uniform humidity, one humidity detector 71 is sufficient. However, when the humidity is different depending on places inside the winding step unit 5, the humidity detectors 71 are preferably arranged in a plurality of places, for example two places including the vicinity of the discharge port of the drying oven 40 and the vicinity of the winding roll 50, or further including the vicinity of a roller in a conveying path.

Even if the humidity environment is non-uniform inside the winding step unit 5, the humidity needs only to be in the range of 10% or more and 60% or less. The winding step unit 5 surrounded by a dotted line in FIG. 1 may be arranged, separately from the coating step or the drying step, inside a housing in which the humidity is adjusted to be controllable, or as long as the humidity in the winding step unit 5 can be controlled in the range of 10% or more and 60% or less, the winding step unit 5 may be exposed and arranged in indoor facilities.

In the present embodiment, the humidity adjusting device 72 has a dehumidification function and a humidification function. However, according to a natural environment in a region in which production is performed, only a dehumidifier or a humidifier may be arranged.

The control unit 73 may be interlocked with a computer that controls the production apparatus 1 per se, or when the humidity in the winding step unit 5 is 10% or more and 60% or less, production of the composite 52 for acid gas separation may be adjusted to be suspended.

Thus, a problem caused when the acid gas separation facilitated transport membrane being the gel membrane having significantly high water absorptivity absorbs moisture in an environmental atmosphere can be suppressed by controlling the humidity in the step unit 5 including an area from the outlet of the drying oven to the composite 52 for acid gas separation being wound around the winding roll, and sticking of the membrane onto the conveying roll in contact with the coated surface can be suppressed. Thus, contamination in a process path can be suppressed, and therefore efficient production can be made, and simultaneously the acid gas separation facilitated transport membrane having a limited number of defects can be obtained.

In addition, generally as in the above-mentioned embodiment, controlling of the atmosphere from the drying unit to the winding unit by single air conditioning is preferred in terms of cost. However, without limiting to air conditioning in the winding step unit or the production apparatus as the whole, a form may be adopted in which a movable simplified dehumidifier is arranged, for example in the vicinity of the winding roll 50 to decrease the humidity in a place having high humidity (adjusting the humidity). Moreover, a form may also be adopted in which a simplified hygrometer is installed for a conveying roll 68 or the winding roll 50, for example, a value thereof is referred to, and general air conditioning is adjusted by a humidity adjusting device or a control unit. Furthermore, a form may be adopted in which the humidity is controlled to some extent by air conditioning in the winding step unit or the production apparatus as the whole, and hygrometers are installed for the conveying roll 68 and the winding roll 50 by way of precaution to further adjust the air conditioning.

The process for producing the composite for acid gas separation as related to the present disclosure is specifically described below.

Step of Preparation of Coating Liquid for Acid Gas Separation

First, a coating liquid for formation of an acid gas separation facilitated transport membrane, the coating liquid containing a hydrophilic compound, an acid gas carrier and water, is prepared (hereinafter also referred to as "coating liquid" in abbreviation). In the step for preparing the coating liquid for formation of the acid gas separation facilitated transport membrane, the hydrophilic compound and the acid gas carrier in an appropriate amount for each is added to water.

(Hydrophilic Compound)

Specific examples of the hydrophilic compound contained in the coating liquid include a hydrophilic polymer. The hydrophilic polymer functions as a binder, and when the hydrophilic polymer is used as a composite for acid gas separation, the hydrophilic polymer holds moisture in the acid gas separation facilitated transport membrane to exhibit a function of separating the acid gas by the acid gas carrier. From a viewpoint of the acid gas separation facilitated transport membrane having high water absorptivity (water retention), the hydrophilic polymer preferably has high water absorptivity, and in terms of an amount of water absorption of a physiological salt solution, has an absorptivity of preferably 0.5 g/g or more, further preferably 1 g/g or more, still further preferably 5 g/g or more, still further preferably 10 g/g or more, and particularly preferably 20 g/g or more.

As the hydrophilic polymer contained in the coating liquid, a publicly known hydrophilic macromolecule can be used. However, from viewpoints of water absorptivity, membrane-forming properties, strength and so forth, for example, polyvinyl alcohols, polyacrylic acids, polyethylene oxides, water-soluble celluloses, starches, alginic acids, chitins, polysulfonic acids, polyhydroxy methacrylates, polyvinyl pyrrolidones, poly-N-vinylacetamides, polyacrylamides, polyethyleneimines, polyallylamines, polyvinyl amines and so forth are preferred, and a copolymer thereof can also be preferably used.

A polyvinyl alcohol-polyacrylate copolymer is particularly preferred. The polyvinyl alcohol-polyacrylate copolymer has a high water absorption capability, and also strength of hydrogel thereof is large even during high water absorption. A content of polyacrylate in the polyvinyl alcohol-polyacrylate copolymer is 1 to 95 mol %, preferably 2 to 70 mol %, further preferably 3 to 60 mol %, and particularly preferably 5 to 50 mol %, for example. Specific examples of the polyacrylate include alkali metal salt such as sodium salt and potassium salt, and also ammonium salt and organic ammonium salt.

Specific examples of a commercially available polyvinyl alcohol-polyacrylate copolymer (sodium salt) include Kurastomer AP20 (trade name: manufactured by Kuraray Co., Ltd.).

Moreover, two or more kinds of the hydrophilic polymers may be mixed and used.

As a content of the hydrophilic polymer in the coating liquid, although a level depends on a kind thereof, from viewpoints of forming the membrane as the binder and providing the acid gas separation facilitated transport membrane with a capability of sufficiently holding moisture, the content is preferably 0.5 mass % or more and 50 mass % or less, further preferably 1 mass % or more and 30 mass % or less, and particularly preferably 2 mass % or more and 15 mass % or less.

(Acid Gas Carrier)

The acid gas carrier means a substance that indirectly reacts with the acid gas, or a substance per se that directly reacts with the acid gas. As the acid gas carrier, various kinds of water-soluble inorganic and organic substances that show basicity are used. Specific examples of the substance that indirectly reacts with the acid gas include a substance that reacts with other gases contained in a fed gas to show basicity, in which the resultant basic compound reacts with the acid gas. More specifically, the acid gas carrier means such an alkali metal compound that reacts with a water vapor to release $OH^-$, in which the resultant $OH^-$ reacts with $CO_2$ to allow selective incorporation of $CO_2$ into the membrane. Specific examples of the substance that directly reacts with the acid gas include such a substance per se being basic as a nitrogen-containing compound and sulfur oxide.

Specific examples of the alkali metal compound include at least one kind selected from alkali metal carbonate, alkali metal bicarbonate or alkali metal hydroxide. Here, as an alkali metal, an alkali metal element selected from cesium, rubidium, potassium, lithium and sodium is preferably used.

The alkali metal compound herein is used in the meaning of not only the alkali metal per se, but also including salt and ion thereof.

Specific examples of the alkali metal carbonate include lithium carbonate, sodium carbonate, potassium carbonate, rubidium carbonate and cesium carbonate.

Specific examples of the alkali metal bicarbonate include lithium hydrogen carbonate, sodium hydrogen carbonate, potassium hydrogen carbonate, rubidium hydrogen carbonate and cesium hydrogen carbonate.

Specific examples of the alkali metal hydroxide include lithium hydroxide, sodium hydroxide, potassium hydroxide, cesium hydroxide and rubidium hydroxide.

Above all, alkali metal carbonate is preferred, and a compound containing cesium, rubidium or potassium, the compound having high solubility in water, is preferred. Moreover, two or more kinds of acid gas carriers may be mixed and used. Specific examples preferably include a mixture of cesium carbonate and potassium carbonate.

As the nitrogen-containing compound, for example, such a compound can be used as amino acids including glycine, alanine, serine, proline, histidine, taurine and diaminopropionic acid, hetero compounds including pyridine, histidine, piperazine, imidazole and triazine, alkanolamines including monoethanolamine, diethanolamine, triethanolamine, monopropanolamine, dipropanolamine and tripropanolamine, cyclic polyetheramines including cryptand[2.1] and cryptand[2.2], bicyclic type polyetheramines including cryptand[2.2.1] and cryptand[2.2.2], and porphyrin, phthalocyanine and ethylenediaminetetraacetic acid.

As the sulfur compound, such a compound can be used as amino acids including cystine and cysteine, polythiophene and dodecylthiol.

As a content of the acid gas carrier in the coating liquid, although a level depends on a kind thereof, in order to prevent salting out before coating, and simultaneously to positively exhibit a function of separating the acid gas, the content is preferably 0.3 to 30 mass %, further preferably 0.5 to 25 mass %, and particularly preferably 1 to 20 mass %.

The coating liquid contains the hydrophilic polymer and the acid gas carrier preferably in the mass ratio of 1:9 or more and 2:3 or less, further preferably in the range of 1:4 or more and 2:3 or less, and still further preferably in the range of 3:7 or more and 2:3 or less.

(Thickener)

A thickener may be further used in the coating liquid composition for the purpose of adjusting the viscosity within the temperature range of 15° C. or higher and 35° C. or lower for the coating liquid composition for formation of the acid gas separation facilitated transport membrane composed of the hydrophilic polymer, the acid gas carrier and water, and containing the hydrophilic polymer and the acid gas carrier in the mass ratio of 1:9 or more and 2:3 or less. Any of the thickener may be used, as long the thickener is a compound that may increase the viscosity of the coating liquid composition within the temperature range of 15° C. or higher and 35° C. or lower. For example, a polysaccharide thickener such as agar, carboxymethylcellulose, carrageenan, xanthan gum, guar gum and pectin is preferred, and in view of membrane-forming properties, ease of availability and cost, carboxymethylcellulose is preferred.

Carboxymethylcellulose that can be preferably used is in the range of 0.6 or more and 1.5 or less in a degree of etherification, and in the range of 1 Pa·s or more and 10 Pa·s or less in the measured value of viscosity at 60 rpm in the number of revolutions in B type viscosity measurement when carboxymethylcellulose is formed into a 1 mass % aqueous solution. If such carboxymethylcellulose is used, the coating liquid composition for formation of the acid gas separation facilitated transport membrane, the composition showing desired viscosity at a small content, is easily obtained, and also has a low risk of causing precipitation due to an incapability of dissolution into the coating liquid at least part of components other than a solvent contained in the coating liquid.

Such carboxymethylcellulose is available from a commercial item, and specific preferred examples include CMC2280 manufactured by Daicel FineChem Ltd.

Whether or not the thus prepared coating liquid for formation of the acid gas separation facilitated transport membrane shows any of viscosity, at any of temperatures within the range of 15° C. or higher and 35° C. or lower, in the range of 0.5 Pa·s or more and 10 Pa·s or less in the measured value of viscosity at 60 rpm in the number of revolutions in B type viscosity measurement can be confirmed as described below.

More specifically, the prepared coating liquid for formation of the acid gas separation facilitated transport membrane is charged into a stainless-steel vessel (for example, inner diameter: 4 cm, height: 12 cm) in which a viscometer cylinder (rotor) is adjusted to be sufficiently immersed into the coating liquid. The above-described stainless-steel vessel is immersed into a temperature-adjustable water bath, and while a temperature of the charged coating liquid is adjusted in the range of 15° C. to 35° C., a B type viscometer (manufactured by Tech-Jam Co., Ltd., BL2 1 to 100,000 mPa·s/KN3312481) is operated to read a value for each temperature at 60 rpm in the number of revolutions, and the viscosity of the coating liquid is measured in accordance with JIS Z 8803.

A content of the thickener in the composition (coating liquid) is preferably as small as possible, as long as adjustment can be made so as to show any of viscosity, at any of temperatures within the range of 15° C. or higher and 35° C. or lower, within the range of 0.5 Pa·s or more and 10 Pa·s or less in the measured value of viscosity at 60 rpm in the number of revolutions in B type viscosity measurement. As a general indication, the content is preferably 10 mass % or less, further preferably 0.1 mass % or more and 5 mass % or less, and most preferably 0.1 mass % or more and 2 mass % or less.

(Crosslinking Agent)

Crosslinking of the hydrophilic polymer can be performed by a publicly known technique such as thermal crosslinking, ultraviolet crosslinking, electron-beam crosslinking and radiation crosslinking. The composition of the present disclosure preferably contains a crosslinking agent. In particular, the composition preferably contains a crosslinking agent having two or more functional groups that can react with a polyvinyl alcohol-polyacrylate copolymer and can be thermally crosslinked. Specific examples of the crosslinking agent include polyvalent glycidyl ether, polyhydric alcohol, polyvalent isocyanate, polyvalent aziridine, a haloepoxy compound, polyvalent aldehyde and polyvalent amine.

Here, specific examples of the above-described polyvalent glycidyl ether include ethylene glycol diglycidyl ether, polyethylene glycol diglycidyl ether, glycerol polyglycidyl ether, diglycerol polyglycidyl ether, polyglycerol polyglycidyl ether, sorbitol polyglycidyl ether, pentaerythritol polyglycidyl ether, propylene glycol glycidyl ether and polypropylene glycol diglycidyl ether.

Specific examples of the above-described polyhydric alcohol include ethylene glycol, diethylene glycol, triethylene glycol, tetraethylene glycol, polyethylene glycol glycerol, polyglycerol, propylene glycol, diethanolamine, triethanolamine, polyoxypropyl, an oxyethyleneoxypropylene block copolymer, pentaerythritol and sorbitol.

Specific examples of the above-described polyvalent isocyanate include 2,4-toluylenediisocyanate and hexamethylene diisocyanate. Moreover, specific examples of the above-described polyvalent aziridine include 2,2-bishydroxymethylbutanol-tris[3-(1-aziridinyl)propionate], 1,6-hexamethylenediethylene urea and diphenylmethane-bis-4,4'-N,N'-diethylene urea.

Specific examples of the above-described haloepoxy compound include epichlorohydrin and α-methylchlorohydrin.

Specific examples of the above-described polyvalent aldehyde include glutaraldehyde and glyoxal.

Specific examples of the above-described polyvalent amine include ethylenediamine, diethylenetriamine, triethylenetetramine, tetraethylenepentamine, pentaethylenehexamine and polyethyleneimine.

Among the above-described crosslinking agents, as a thermal crosslinking agent for the polyvinyl alcohol-polyacrylate copolymer, glutaraldehyde is particularly preferred.

(Other Components)

The coating liquid can contain one or more components (additives) other than the hydrophilic polymer, the acid gas carrier and the thickener within the range in which coating properties or gas separation characteristics are not adversely affected. Specific examples of other components include the above-mentioned crosslinking agent, and also a surfactant, a catalyst, a moistening (water absorbent) agent, an auxiliary solvent, a membrane strength regulator and a defect detection agent.

In preparation of the coating liquid, the hydrophilic polymer and the acid gas carrier, and when necessary, other additives including the thickener and the crosslinking agent as mentioned above are added to water (ordinary temperature water or warmed water) in an appropriate amount, respectively, and sufficiently stirred, and when necessary, heated while being stirred to promote dissolution. In addition, the hydrophilic polymer and the acid gas carrier may be separately added to water, or a previously mixed material may be added thereto. For example, when the thickener is incorporated thereinto, the thickener is added to water and dissolved thereinto, and then the hydrophilic polymer and the acid gas carrier are gradually added thereto, and stirred. Thus, precipitation (salting-out) of the hydrophilic polymer or the thickener can be effectively prevented.

Coating Step

With regard to the coating liquid for formation of the acid gas separation facilitated transport membrane, the belt-shaped support 12 is fed from the feeding roll 10 and conveyed to the coater 20 in the coating unit, and the above-described coating liquid is coated onto the support 12 at a temperature of 15° C. or higher and 35° C. or lower and at a viscosity 0.5 Pa·s or more and 10 Pa·s or less in the measured value of viscosity at 60 rpm in the number of revolutions in B type viscosity measurement to provide the liquid membrane of the above-described coating liquid on the support 12. If at least one of the temperature and the viscosity of the coating liquid in the coating step is deviated from the above-described range, sedimentation is liable to be caused in the liquid membrane of the above-described coating liquid, the coating liquid 30 on the coater 20 of the coating device is liable to flow out, the water absorbent polymer is liable to precipitate (salt out) to cause difficulty in coating onto the support, and a fluctuation in thickness is liable to become large.

The support 12 has a role of supporting the acid gas separation facilitated transport membrane, and is not particularly limited, as long as the support 12 has acid gas permeability, on which the composition (coating liquid) for formation of the acid gas separation facilitated transport membrane can be coated to form the acid gas separation facilitated transport membrane, and further the support 12 can support the membrane.

As the material of the support 12, paper, high-quality paper, coated paper, cast-coated paper and synthetic paper, and also cellulose, polyester, polyolefin, polyamide, polyimide, polysulfone aramid, polycarbonate, metal, glass, ceramics or the like can be preferably used. More specifically, such a resin material can be preferably used as polypropylene, polyethylene, polystyrene, polyphenyl sulfide, polyether imide, polyether ether ketone, polysulfone, polyether sulfone, polyethylene terephthalate, polytetrafluoroethylene and polyvinylidene fluoride. Above all, polyolefin and a fluorinated product thereof can be particularly preferably used from a viewpoint of stability over time.

As a form of the support 12, a woven fabric, a nonwoven fabric, a porous membrane or the like can be adopted. In general, a support having a high self-supporting property and high porosity can be preferably used. A membrane of membrane filter of polysulfone or cellulose, an interfacial-polymerization thin membrane of polyamide or polyimide, or a stretched porous membrane of polytetrafluoroethylene or high-molecular-weight polyethylene are preferred from viewpoints of high porosity, only limited inhibition of diffusion of the acid gas, strength, production adaptability or the like. Above all, a stretched membrane of polytetrafluoroethylene (PTFE) is particularly preferred.

Although these supports can be used alone, a composite membrane integrated with a support for reinforcement can also be preferably used.

As the support 12, in particular, the laminated membrane between the hydrophobic porous membrane and the nonwoven fabric serving as the auxiliary support membrane is preferably used. Mechanical strength can be improved by having the auxiliary support membrane. Therefore, even if handling is performed in the roll-to-roll coating device, an effect of no wrinkling on the support membrane is exhibited, and thus the productivity can also be improved. On the above occasion, the laminated membrane composed of PTFE as the hydrophobic porous membrane, and polypropylene (PP) that is inexpensive and has large mechanical strength as the nonwoven fabric is particularly preferably used.

The hydrophobic porous membrane means that a surface of the porous membrane on a side in contact with the facilitated transport membrane is a hydrophobic surface. If the surface is hydrophilic, the facilitated transport membrane into which moisture is incorporated is easily penetrated into a porous portion under a use environment to have an anxiety of causing a thickness distribution or performance deterioration over time. Here, hydrophobicity means that a contact angle with water at room temperature (25° C.) is about 80° C. or more.

If the support 12 is too thick, gas permeability decreases, and if the support 12 is too thin, the strength is imperfect. Therefore, a thickness of the support is preferably 30 to 500 μm, further preferably 50 to 300 μm, and still further preferably 50 to 200 μm. Moreover, in order to avoid occurrence of distortion or fracture of the support in production according to Roll-to-Roll, Young's modulus of the support is preferably 0.4 GPa or more, for example. When the support 12 is the laminated membrane between the porous membrane and the nonwoven fabric, a thickness of the porous membrane is preferably about 5 to 100 μm, and a thickness of the nonwoven fabric is preferably about 50 to 300 μm.

With regard to a rate of conveyance of the support 12, although a level depends on a kind of the support 12, viscosity of the composition (coating liquid) or the like, if the rate of conveyance of the support is too high, uniformity of thickness of the coated membrane in the coating step is liable to reduce, and if the rate is too low, productivity is liable to reduce, and also the viscosity of the composition is also liable to increase before a cooling step to cause reduction of uniformity of the coated membrane. The rate of conveyance of the support 12 may be determined according to the kind of the support 12, the viscosity of the composition or the like also in consideration of the above-described points, and the rate is preferably 1 m/min or more, further preferably 10 m/min or more and 200 m/min or less, and particularly preferably 20 m/min or more and 200 m/min or less.

As a coater for coating the coating liquid as related to the present disclosure onto the support, a roll coater or blade coater is particularly preferred.

The roll coater is a coater composed of a singular roll or in combination of a plurality of rolls to control an amount of the coating liquid to be held on a surface of a roll (applicator roll) arranged in a position nearest to the support and to transfer an amount at a predetermined ratio of the coating liquid on the (applicator roll) onto a surface of the support.

Specific examples of a preferred roll coater include a direct gravure coater, an offset gravure coater, a one-roll kiss coater, a three-reverse roll coater and a normal rotation roll coater, and a three-reverse roll coater is preferred, in which the coater is suitable for coating of the coating liquid having middle viscosity to high viscosity of 0.3 Pa·s or more to 20 Pa·s or less in the measured value of viscosity at 60 rpm in the number of revolutions in B type viscosity measurement.

The blade coater is a coater for coating an excessive amount of the coating liquid onto the support, and then scraping off an excessive portion of the coating liquid on the support by using a blade.

Drying Step

In the drying step, at least part of water is removed in the drying oven 40, the water being the solvent contained in the coated membrane of the coating liquid for formation of the acid gas separation layer, the liquid membrane being formed on the support in the coating step. Such a drying step is performed by heating the support on which the coated membrane is held, blowing dry air onto the coated membrane, or both thereof.

In order to avoid occurrence of deformation or the like of the support and to allow rapid drying of the liquid membrane of the coating liquid, a temperature in the drying oven is preferably set in the range of 60° C. or higher and 120° C. or lower. The temperature is adjusted preferably to 60° C. or higher and 90° C. or lower, and further preferably to 70° C. or higher and 80° C. or lower. A membrane surface temperature is preferably in range of 15° C. or higher and 80°

C. or lower, and particularly preferably in the range of 30° C. or higher and 70° C. or lower.

(Crosslinking Step)

The crosslinking step may be performed simultaneously with or separately from the drying step. Moreover, as a crosslinking technique, a publicly known crosslinking technique may be applied. For example, the acid gas separation facilitated transport membrane may be heated, after the above-described drying step, by a heating means such as an infrared heater to cause crosslinking, or may be crosslinked together with drying by warm air in the drying step. The thermal crosslinking can be performed by heating at about 100 to 150° C. In the coating step, the liquid membrane of the coating liquid formed on the support is optionally subjected to UV- or electron-beam crosslinking, and then dried. In addition, a dried membrane obtained in the drying step may be crosslinked according to so-called bulk processing in which the membrane is wound around the winding roll 50, and then crosslinked.

Winding Step

The liquid membrane of the facilitated transport membrane for acid gas separation, the membrane being coated on the support in the coating step, is dried in the drying oven, and the facilitated transport membrane for acid gas separation is formed on the composite 52 for acid gas separation, and the composite 52 is wound around the winding roll. On the above occasion, the humidity in the winding step unit 5 is measured by the humidity detector 71, and the control unit 73 controls the humidity adjusting device 72 to adjust the humidity in the winding step unit 5 according to the measured humidity. Thus, the winding step is to be performed under the environment of the humidity of 10% or more and 60% or less.

The composite for acid gas separation as related to the present disclosure is obtained through the above-described steps.

A specific module for acid gas separation to which the composite for acid gas separation of the present disclosure is applied is described below.

<Spiral Type Module for Acid Gas Separation>

Figure 2:
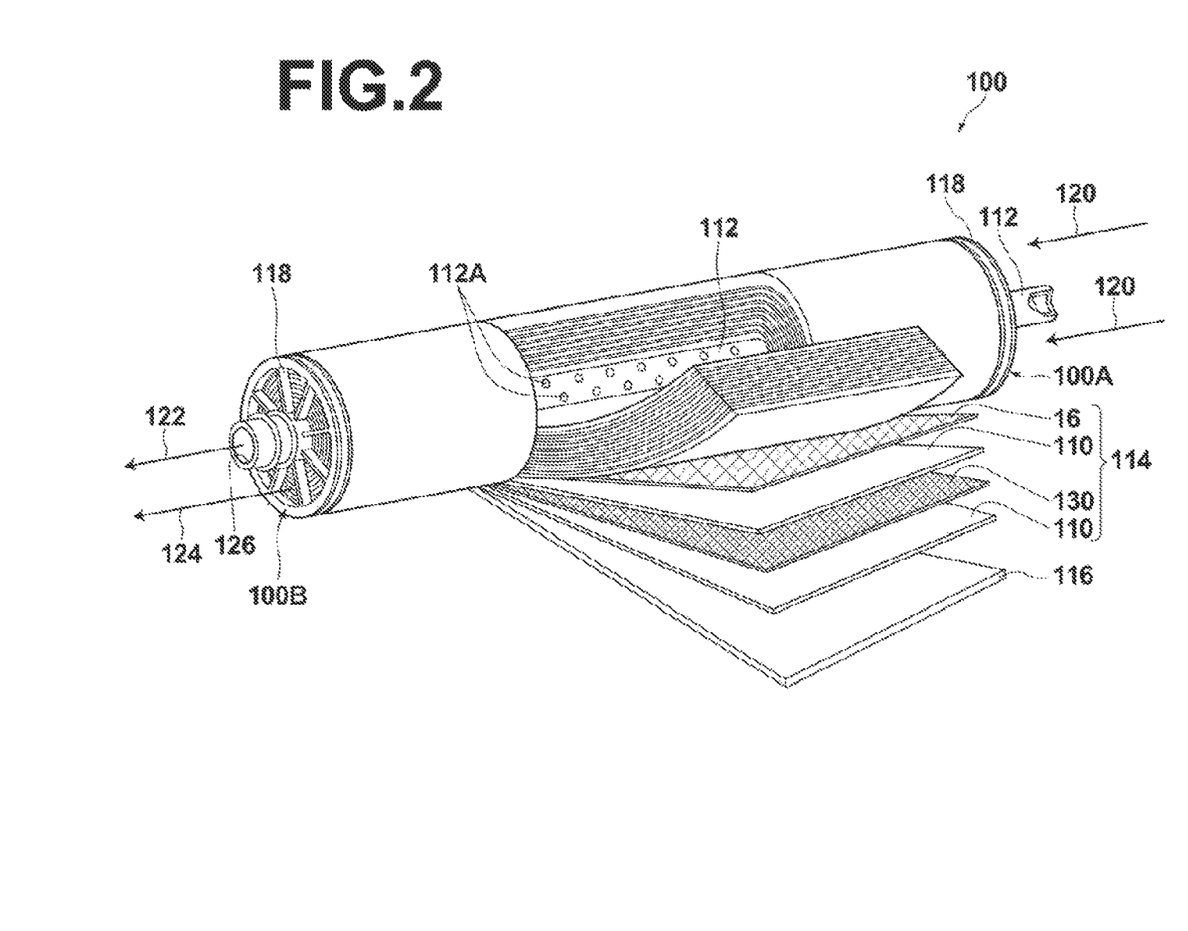
FIG. 2 is a partially cut-away schematic structure view showing one embodiment of a module for acid gas separation to which a composite for acid gas separation to be prepared by a production method of the present disclosure is applied.

FIG. 2 is a partially cutaway schematic structural view showing a spiral type module 100 for acid gas separation, the module 100 being a first embodiment of the module for acid gas separation of the present disclosure.

As shown in FIG. 2, the module for acid gas separation 100 is structured as basic structure such that, in a state in which a singular laminate 114 or plural laminates 114 as described later are wound around a transmitted gas collecting tube 112, an outermost periphery of the laminate 114 is covered with a covering layer 116, and telescope prevention plates 118 are attached on both ends of these units, respectively. If a raw material gas 120 containing an acid gas is fed to the laminate 114 from a side of one end portion 100A, the module 100 separates the raw material gas 120 into an acid gas 122 and a remaining gas 124 by the structure of the laminate 114 to discharge the gases separately to a side of the other end portion 100B.

The transmitted gas collecting tube 112 is a cylindrical tube in which a plurality of through-holes 112A are formed on a tube wall. A tube on a side of one end portion (one end portion 100A side) of the transmitted gas collecting tube 112 is closed, and a tube on a side of the other end portion (the other end portion 100B side) is opened to serve as a discharge port 126 through which the acid gas 122 such as carbon dioxide that is transmitted through the laminate and is collected from the through-holes 112A is discharged.

A shape of the through-holes 112A is not particularly limited, but 1 to 20 mmφ-circular holes are preferably opened. Moreover, the through-holes 112A are preferably uniformly arranged on a surface of the transmitted gas collecting tube 112.

The covering layer 116 is formed of a shutoff material that may shut off the raw material gas 120 that passes through an inside of the module 100 for acid gas separation. The shutoff material preferably further has heat and moisture resistance. Here, "heat resistance" of the heat and moisture resistance means that the material has heat resistance of 80° C. or higher. Specifically, the heat resistance of 80° C. or higher means that, even after the material is stored for 2 hours under temperature conditions of 80° C. or higher, a form before storage is maintained, and no visually confirmable curling due to thermal shrinkage or thermal fusion occurs. Moreover, "moisture resistance" of the heat and moisture resistance means that, even after the material is stored for 2 hours under conditions of 40° C. and 80% RH, a form before storage is maintained, and no visually confirmable curling due to thermal shrinkage or thermal fusion occurs.

The telescope prevention plate 118 is preferably formed of a heat and moisture-resistant material.

The laminate 114 is formed by laminating a member 16 for transmitted gas flow channel, a composite 110 for acid gas separation, a member 130 for fed gas flow channel and the composite 110 for acid gas separation, and a singular laminate or plural laminates are wound around the transmitted gas collecting tube 112. Owing to lamination of the membranes, the raw material gas 120 containing the acid gas 122 is fed from an end portion of the member 130 for fed gas flow channel. The acid gas 122 that is transmitted through the composite 110 for acid gas separation as divided by the covering layer 116 and is separated is accumulated into the transmitted gas collecting tube 112 through the member 16 for transmitted gas flow channel and the through-holes 112A, and is recovered from the discharge port 126 connected to the transmitted gas collecting tube 112. Moreover, the remaining gas 124 from which the acid gas 122 is separated, and which passes through pores of the member 130 for fed gas flow channel or the like is discharged from an end portion of the gas separation composite 110 for acid gas separation.

The composite 110 for acid gas separation is produced according to the production method of the present disclosure, and is composed of the porous support obtained by laminating the porous membrane and the auxiliary support membrane, and the acid gas separation facilitated transport membrane arranged on the side of the porous membrane of the porous support and containing at least the hydrophilic polymer and the acid gas carrier that reacts with the acid gas in the raw material gas.

The number of sheets of laminates 114 to be wound around the transmitted gas collecting tube 112 is not particularly limited and may be singular or plural, but a membrane area of the facilitated transport membrane can be increased by increasing the number of sheets (number of lamination). Thus, an amount of the acid gas 122 separable by one module can be increased. In order to increase the membrane area, a length of the laminate 114 may also be further increased.

(Member for Fed Gas Flow Channel)

The member 130 for fed gas flow channel is a member to which the material gas containing the acid gas is fed from one end portion of the module for acid gas separation. The member 130 preferably has a function as a spacer, and causes turbulence for the raw material gas, and therefore a net-shaped member is preferably used. A gas flow channel changes depending on a shape of the net, and therefore the shape of a unit lattice of the net is selected from a shape such as a rhombus and a parallelogram according to the purpose, and used. Moreover, if feeding of a raw material gas containing the water vapor at a high temperature is assumed, the member for fed gas flow channel preferably has moisture and heat resistance in a manner similar to an acid gas separation layer described later.

A material of the member 130 for fed gas flow channel is not particularly limited. Specific examples include paper, high-quality paper, coated paper, cast-coated paper, synthetic paper, cellulose, a resin material such as polyester, polyolefin, polyamide, polyimide, polysulfone, aramid and polycarbonate, and an inorganic material such as metal, glass and ceramics. Specific examples of the resin material preferably include polyethylene, polystyrene, polyethylene terephthalate, polytetrafluoroethylene (PTFE), polyether sulfone (PES), polyphenylene sulfide (PPS), polysulfone (PSF), polypropylene (PP), polyimide, polyether imide, polyether ether ketone and polyvinylidene fluoride.

From a viewpoint of the moisture and heat resistance, specific examples of preferred material include an inorganic material such as ceramics, glass and metal, and an organic resin material having heat resistance of 100° C. or higher, and high molecular-weight polyester, polyolefin, heat-resistant polyamide, polyimide, polysulfone, aramid, polycarbonate, metal, glass, ceramics or the like can be preferably used. More specifically, the material is preferably composed by containing at least one material selected from the group of ceramics, polytetrafluoroethylene, polyvinylidene fluoride, polyether sulfone, polyphenylene sulfide, polysulfone, polyimide, polypropylene, polyether imide and polyether ether ketones.

A thickness of the member for fed gas flow channel is not particularly limited, but is preferably 100 μm or more and 1,000 μm or less, further preferably 150 μm or more and 950 μm or less, and still further preferably 200 μm or more and 900 μm or less.

(Member for Transmitted Gas Flow Channel)

The member 16 for transmitted gas flow channel is a member in which the acid gas that reacts with the carrier and is transmitted through the composite 110 for acid gas separation flows toward the through-holes. The member 16 for transmitted gas flow channel has the function as the spacer, and also has a function of allowing the transmitted acid gas to flow inwardly from the member 16 for transmitted gas flow channel. Specific examples include a tricot knit shape. As a material of the member for transmitted gas flow channel, the material similar to the material of the member for fed gas flow channel can be used. Moreover, if flowing of the raw material gas containing the water vapor at a high temperature is assumed, the member for transmitted gas flow channel preferably has the moisture and heat resistance similar to the acid gas separation layer.

As a specific raw material to be used in the member for transmitted gas flow channel, a polyester base such as epoxy-impregnated polyester, a polyolefin base such as polypropylene or a fluorine base such as polytetrafluoroethylene is preferred.

A thickness of the member for transmitted gas flow channel is not particularly limited, but is preferably 100 μm or more and 1,000 μm or less, further preferably 150 μm or more and 950 μm or less, and still further preferably 200 μm or more and 900 μm or less.

As the module for acid gas separation, the composite for acid gas separation produced according to the production method of the present disclosure may be installed as a flat membrane, or can also be processed into a spiral type known as a reverse osmosis membrane module, or a pleated type having a shape described, for example in Japanese Unexamined Patent Publication No. 2010-279885, and used.

Further, the carbon dioxide separation module as related to the present disclosure can be set in a carbon dioxide separation device, and used.

EXAMPLE

The present disclosure is described in more detail by way of Examples below.

Example 1

(Preparation Step)

A 5% cesium carbonate aqueous solution and an aqueous solution adjusted to be 2.5% PVA-PAA copolymer (Kuraray Co., Ltd; Kurastomer AP) and 0.3% glutaraldehyde (manufactured by Wako Pure Chemical Industries, Ltd.) was heated and stirred, and as a coating liquid for acid gas separation, a coating liquid for carbon dioxide separation was prepared.

(Coating Step)

Onto a laminate (supported PTFE) between a porous hydrophobic support of polytetrafluoroethylene (PTFE) having a pore diameter of 0.05 μm, and a woven fabric of polytetrafluoroethylene (PTFE), the coating liquid prepared in the above-described preparation step was coated by an applicator.

As a coating method, a blade coating method was selected, and a blade height was adjusted to 0.3 mm to perform application at a liquid membrane thickness of 0.3 mm.

(Drying Step)

The liquid membrane obtained in the coating step was dried in a drying oven. In drying, a method was applied in which water from the liquid membrane was volatilized by continuously passing the membrane through seven places in a 3.0 m drying zone according to a warm air method to form a carbon dioxide separation membrane on the support. In addition, drying zones 1 to 2 were adjusted to 60° C., drying zones 3 to 4 were adjusted to 80° C., and drying zones 5 to 7 were adjusted to 90° C.

(Winding Step)

The support on which the carbon dioxide separation membrane was formed as described above was wound by using a winding roll.

In a production apparatus having structure similar to the structure of the apparatus 1 shown in FIG. 1, thermohygrometers (Ondotori JC-M3200, manufactured by Nihon Keiryoki Kogyo) were installed for a roll 65 and a roll driving unit of a winding roll 50 to control temperature and humidity in each site. In an atmosphere from an outlet of drying to the winding unit (winding step unit), humidity was made adjustable in a common package 5 for low humidity. Air in which setting in the package was adjusted to 25° C. and 35%, and humidity and temperature were adjusted was fed from the outlet of drying to the winding unit. Specifically, air in which the humidity was adjusted in the package is fed to a coated membrane surface on the support between the roll 65 and a roll 66 in FIG. 1. On the above occasion, the humidity detected by the above-described hygrometer was 40% in an outlet portion of drying and 38% in the winding unit.

Example 2

Application was performed at a liquid membrane thickness of 1.5 mm by adjusting the blade height in Example 1 to 1.5 mm. Drying zones 1 to 2 were adjusted to 70° C., drying zones 3 to 4 were adjusted to 90° C., and drying zones 5 to 7 were adjusted to 100° C. Temperature and humidity conditions from the outlet of drying to the winding unit were adjusted in a manner similar to the conditions in Example 1.

Example 3

Application was performed at a liquid membrane thickness of 3.0 mm by adjusting the blade height in Example 1 to 3.0 mm. Drying zones 1 to 2 were adjusted to 80° C., drying zones 3 to 4 were adjusted to 100° C., and drying zones 5 to 7 were adjusted to 110° C. Temperature and humidity conditions from the outlet of drying to the winding unit were adjusted in a manner similar to the conditions in Example 1.

Example 4

Application was performed at a liquid membrane thickness of 3.0 mm by adjusting the blade height in Example 1 to 3.0 mm. Drying zones 1 to 2 were adjusted to 80° C., drying zones 3 to 4 were adjusted to 100° C., and drying zones 5 to 7 were adjusted to 110° C. Air subjected to adjustment of temperature and humidity by adjusting, to 25° C. and 50%, set values in a package in an area from an outlet of drying to a winding unit was fed from the outlet of drying to the winding unit.

Example 5

Air subjected to adjustment of temperature and humidity by adjusting, to 25° C. and 10%, the set values in the package in the area from the outlet of drying to the winding unit in Example 1 was fed from the outlet of drying to the winding unit.

Example 6

Air subjected to adjustment of temperature and humidity by adjusting, to 25° C. and 59%, by adjusting the set values in the package in area from the outlet of drying to the winding unit in Example 4 was fed from the outlet of drying to the winding unit.

Comparative Example 1

Application was performed at a liquid membrane thickness of 0.1 mm by adjusting the blade height in Example 1 to 0.1 mm. Drying zones 1 to 2 were adjusted to 60° C., drying zones 3 to 4 were adjusted to 80° C., and drying zones 5 to 7 were adjusted to 90° C. Air in which set values in the package in the atmosphere from the outlet of drying to the winding unit were adjusted to 25° C. and 35%, and temperature and humidity were adjusted was fed from the outlet of drying to the winding unit.

Comparative Example 2

Application was performed at a liquid membrane thickness of 4.0 mm by adjusting the blade height in Example 1 to 4.0 mm. Drying zones 1 to 2 were adjusted to 80° C., drying zones 3 to 4 were adjusted to 100° C., and drying zones 5 to 7 were adjusted to 110° C. Air in which set values in the package in the atmosphere from the outlet of drying to the winding unit were adjusted to 25° C. and 35%, and temperature and humidity were adjusted was fed from the outlet of drying to the winding unit.

Comparative Example 3

Drying zones 1 to 2 were adjusted to 90° C., drying zones 3 to 4 were adjusted to 110° C., and drying zones 5 to 7 were adjusted to 130° C. in Comparative Example 2.

Evaluation Method

The thus prepared membranes were evaluated as described below. The evaluation results are collectively shown in Table 1 together with conditions in each

Example and Comparative Example (Evaluation 1) A coated membrane on a pass roll apart by 50 cm from an outlet of drying zone was touched with a hand, and whether or not a gel-like substance in an undried state adhered onto the hand was confirmed to evaluate a surface state. A sufficiently dried membrane was evaluated as Dry, and an undried or poor surface-state membrane was evaluated as NG.

(Evaluation 2) With regard to Examples and Comparative Examples in which judgment was made to be Dry in Evaluation 1, winding was performed to confirm a state of adhesion onto a surface of a touch roll on a coating surface (surface of the roll 67 in FIG. 1). A case of no adhesion was evaluated as A, a case in an acceptable level even with cloudiness on the surface was evaluated as B, and a case of presence of adhesion on the surface or deformed membrane was evaluated as C.

(Evaluation 3) A moisture content was evaluated by cutting out a 10 mm-square sample in the tested place in Evaluation 1, and weight measurement was carried out. Then, after the same sample was allowed to stand for 3 h in a drying oven at 80° C., weight measurement was carried out again. The moisture content in the membrane was calculated from a weight change.

(Evaluation 4) A thickness of the carbon dioxide separation facilitated transport layer was measured using a stylus type thickness gauge.

(Evaluation 5) Defects in the carbon dioxide separation layer were confirmed through visual observation. Here, as the visual observation, observation was made as to whether or not, in contact with the touch roll on the coating surface, neither peeling nor unevenness or the like was caused in the separation membrane layer. A case of non-existence of peeling and unevenness was evaluated as OK, and a case of existence of defects or membrane cracking was evaluated as NG. In Comparative Example 1, a large number of defects were found.

(Evaluation 6) Gas leak and gas separation performance were measured. Here, the carbon dioxide separation members prepared in Examples 1 to 6 and Comparative Examples 1 to 2 were used to evaluate performance of carbon dioxide gas separation as described below. Each member was cut out into a specimen having a diameter of 47 mm, and the specimen was interposed between PTFE membranes to prepare a transmission test sample. As a test gas, a raw material gas of $H_2:CO_2:H_2O=45:5:50$ (flow rate: 2.2 L/min) was fed to each carbon dioxide separation membrane at a temperature of 130° C. and a total pressure of 301.3 kPa. Onto a transmission side, an Ar gas (flow rate: 0.6 L/min)

was allowed to flow. A transmitted gas was analyzed by gas chromatograph, and a $CO_2$ transmission rate ($P(CO_2)$) was calculated. Preparation and performance evaluation of the carbon dioxide separation membrane were performed 5 times, and the results were evaluated based on criteria as described below. In addition, a unit of the transmission rate is: ($1\ GPU = 1 \times 10^{-6}\ cm^3\ (STP)/(s \cdot cm^2 \cdot cmHg)$).

A: 30 GPU or more in an average value.
B: 20 GPU or more and less than 30 GPU in the average value.
C: less than 20 GPU in the average value.

mation of the acid gas separation facilitated transport membrane on the porous support,
wherein humidity in a winding step unit in which the winding step is performed is measured to control the humidity to be 10% or more and 60% or less,
wherein the winding step is performed under the controlled humidity conditions, and
wherein temperature is adjusted to 60° C. or higher at a side of an inlet of the drying oven and becomes higher in the range of 120° C. or lower toward a side of discharge of the oven.

TABLE 1

| LEVEL | EXAMPLE 1 | EXAMPLE 2 | EXAMPLE 3 | EXAMPLE 4 | EXAMPLE 5 | EXAMPLE 6 | COMPARATIVE EXAMPLE 1 | COMPARATIVE EXAMPLE 2 | COMPARATIVE EXAMPLE 3 |
|---|---|---|---|---|---|---|---|---|---|
| LIQUID MEMBRANE THICKNESS [mm] | 0.3 | 1.5 | 3 | 3 | 0.3 | 3 | 0.1 | 4 | 4 |
| COATING RATE [m/min] | 7 | 7 | 7 | 7 | 7 | 7 | 7 | 7 | 7 |
| DRYING ZONE 1 TO 2 [° C.] | 60 | 70 | 80 | 80 | 60 | 80 | 60 | 80 | 90 |
| DRYING ZONE 3 TO 4 [° C.] | 80 | 90 | 100 | 100 | 80 | 100 | 80 | 100 | 110 |
| DRYING ZONE 5 TO 7 [° C.] | 90 | 100 | 110 | 110 | 90 | 110 | 90 | 110 | 130 |
| HUMIDITY IN OUTLET OF DRYING [%] | 40 | 40 | 40 | 52 | 12 | 60 | 38 | 38 | 37 |
| HUMIDITY IN WINDING UNIT [%] | 38 | 38 | 38 | 51 | 10 | 58 | 36 | 36 | 36 |
| (1) MEMBRANE STATE IN OUTLET | Dry | Dry | Dry | Dry | Dry | Dry | Dry | NG UNDRIED | NG STRONG SURFACE UNEVENNESS STRONG ELOBGATIO OF SUPPORT |
| (2) PASS ROLL SURFACE STATE | A | A | B | B | A | B | B | C ADHESION ONO ROLL | C MEMBRANE DEFORMATION ON PASS ROLL |
| (3) MOISTURE CONTENT [%] | 5 | 8 | 15 | 18 | 4.8 | 19 | 4.0 | — | — |
| (4) THCKNESS OF SEPARATION FACILITATED TRANSPORT LAYER [μm] | 20 | 60 | 180 | 190 | 19 | 192 | 11 | — | — |
| (5) DEFECTS | OK | OK | OK | OK | OK | OK | NG | NG | NG |
| (6)-1 GAS LEAK | NO | NO | NO | NO | NO | NO | YES | YES | YES |
| (6)-2 SEPARATION PERFORMANCE | A | A | B | B | A | B | — | — | — |

As shown in Table 1, in Examples of the present disclosure, the separation facilitated transport membrane having no gas leak and sufficient separation performance was obtainable. On the other hand, in Comparative Examples, all had membrane defects and gas leak, and therefore separation performance was unevaluable.

What is claimed is:

1. A method of producing a composite for acid gas separation, the composite provided with an acid gas separation facilitated transport membrane having a function of separating an acid gas in a raw material gas on a porous support, according to a roll-to-roll process, comprising:
   a coating liquid preparation step for preparing a coating liquid for formation of the acid gas separation facilitated transport membrane containing a hydrophilic compound, an acid gas carrier and water;
   a coating step for coating onto the porous support the coating liquid for formation at a liquid membrane thickness of 0.3 mm to 3.0 mm;
   a drying step for drying the coated liquid membrane in a drying oven to form the acid gas separation facilitated transport membrane; and
   a winding step for winding around a winding roll the composite for acid gas separation formed through for- 2. The method of producing the composite for acid gas separation according to claim 1, wherein the humidity is controlled to be 10% or more and 40% or less.

3. The method of producing the composite for acid gas separation according to claim 1, wherein a laminated membrane comprising a hydrophobic porous membrane and a nonwoven fabric is used as the porous support, and
   the coating liquid for formation is coated onto the hydrophobic porous membrane of the laminated membrane.

4. The method of producing the composite for acid gas separation according to claim 1, wherein the hydrophilic polymer is a polyvinyl alcohol-polyacrylic acid copolymer.

5. The method of producing the composite for acid gas separation according to claim 1, wherein the acid gas carrier contains a compound containing at least one selected from alkali metal carbonate.

6. An apparatus for producing a composite for acid gas separation, the composite provided with an acid gas separation facilitated transport membrane having a function of separating an acid gas in a raw material gas on a porous support, according to a roll-to-roll process, comprising:
   a coating unit for coating onto the porous support a coating liquid for formation of the acid gas separation facilitated transport membrane, the coating liquid containing a hydrophilic compound, an acid gas carrier and water, at a liquid membrane thickness of 0.3 mm to 3.0 mm;

a drying unit for drying the coated liquid membrane in a drying oven to form the acid gas separation facilitated transport membrane; and a winding step unit for winding around a winding roll the composite for acid gas separation formed through formation of the acid gas separation facilitated transport membrane on the porous support, wherein the winding step unit is provided with a humidity detector for measuring humidity in the winding step unit, a humidity adjusting unit for adjusting the humidity to be 10% or more to 60% or less, and a control unit for controlling adjustment by the humidity adjusting unit according to the humidity measured by the humidity detector, and wherein temperature is adjusted to 60° C. or higher at side of an inlet of the drying oven and becomes higher in the range of 120° C. or lower toward a side of discharge of the oven.

* * * * *